Mar. 27, 1923.
P. MacKENZIE.
COMBINED DRILL AND VALVE GRINDER.
FILED NOV. 28, 1921.
1,450,003.
2 SHEETS—SHEET 1.
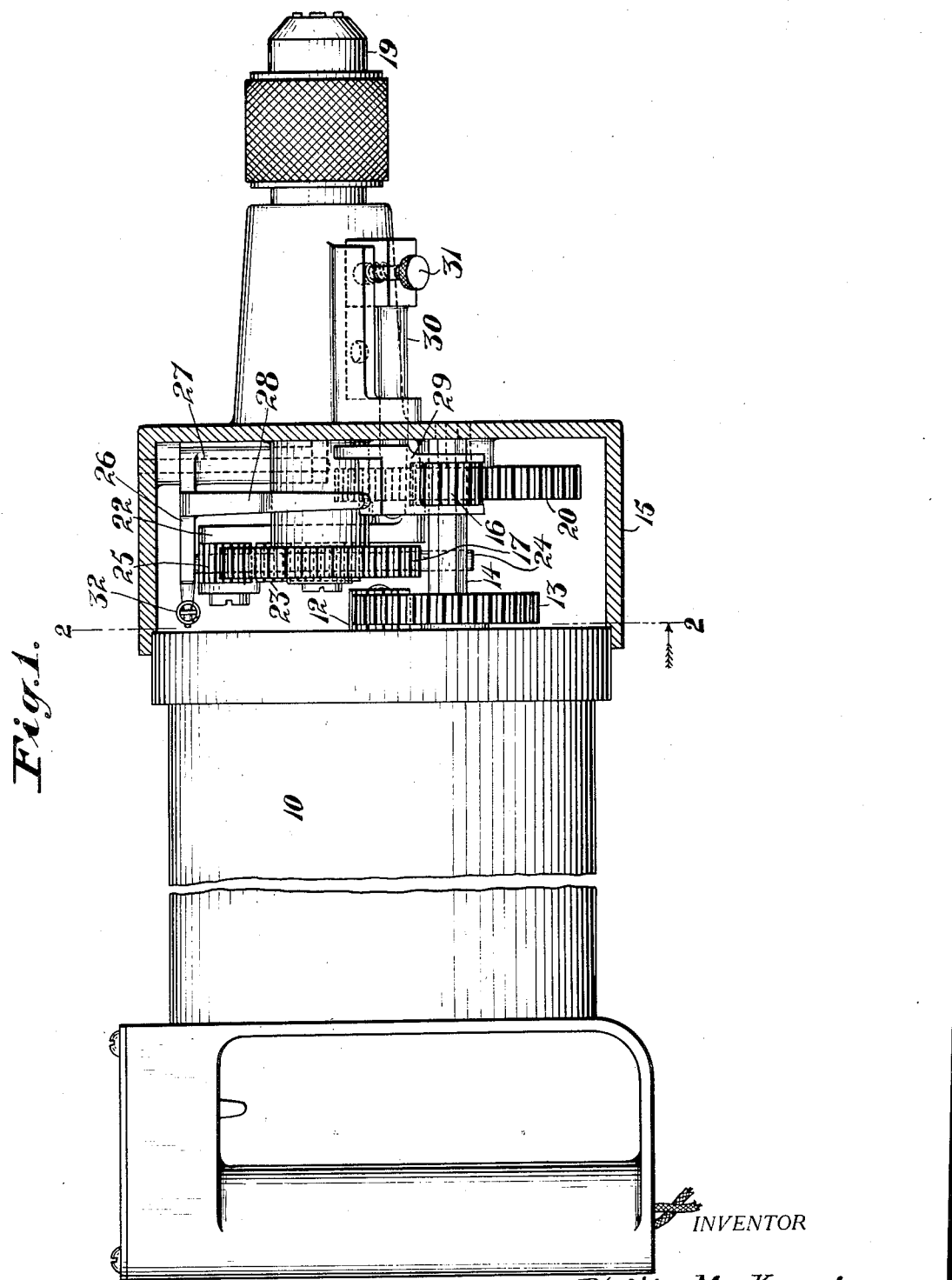
INVENTOR
Philip MacKenzie
By Chas. E. Townsend
ATTORNEY

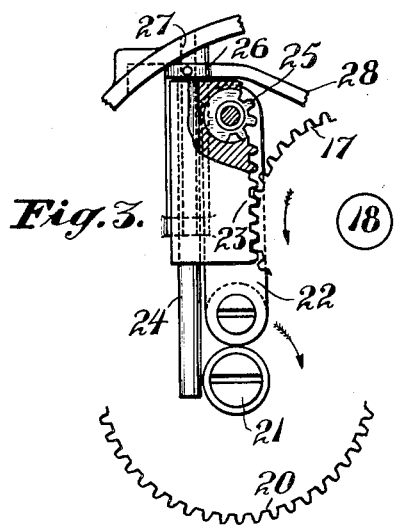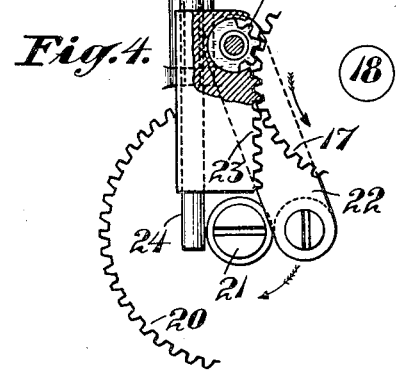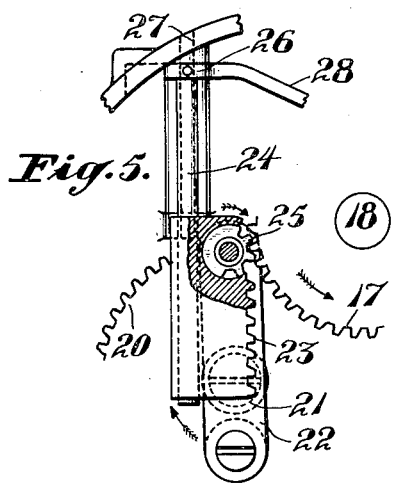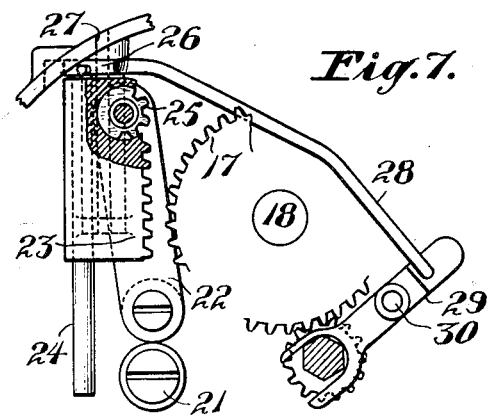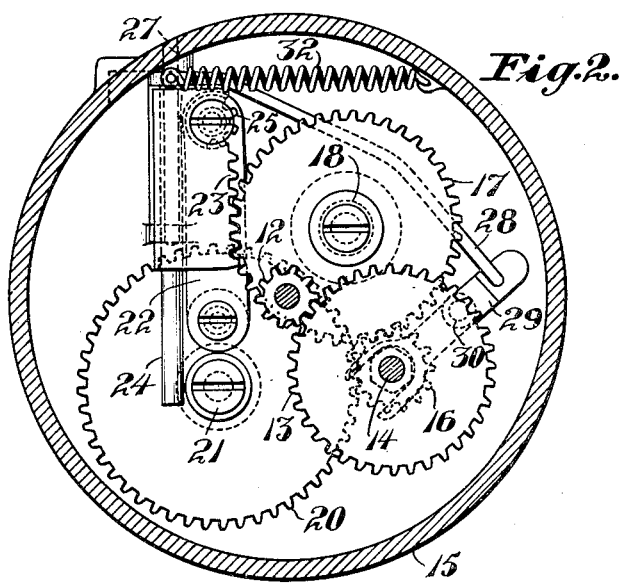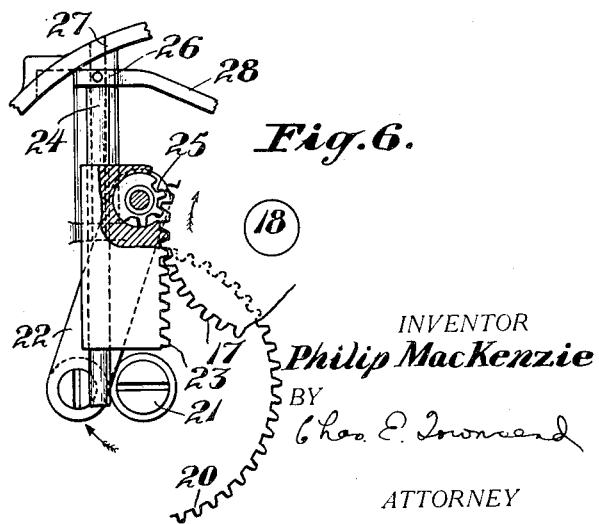

Patented Mar. 27, 1923.

1,450,003

UNITED STATES PATENT OFFICE.

PHILIP MacKENZIE, OF SAN FRANCISCO, CALIFORNIA.

COMBINED DRILL AND VALVE GRINDER.

Application filed November 28, 1921. Serial No. 518,265.

*To all whom it may concern:*

Be it known that I, PHILIP MACKENZIE, a citizen of the Dominion of Canada, residing at the city and county of San Francisco and State of California, have invented new and useful Improvements in Combined Drills and Valve Grinders, of which the following is a specification.

This invention relates to combined drills and valve grinders of the type shown and described in my U. S. Letters Patent No. 1,425,402, dated August 8th, 1922. The object of the present invention is to simplify and improve the construction and operation of a machine tool of the character mentioned.

In the prior application above mentioned I obtain the oscillating movement necessary for valve grinding purposes by means of two swinging pawls mounted on a crank arm and controlled in their swinging movement by eccentric connections. One pawl had a longer throw than the other so that the tool holder could be stepped ahead slightly at each cycle. In the present application I substitute for the pawl mechanism referred to a sliding toothed rack, near one end of which is a rocking segmental pinion. The rack and segmental pinion are operatively connected to a crank arm, and the rack serves to actuate the driving gear for the tool holder in both directions, but at one end of its stroke the segmental pinion comes into mesh with the driving gear and on account of its rocking movement serves to advance the driving gear one or more teeth, as desired. This mechanism is somewhat simpler and more effective than the mechanism of my prior application above referred to.

In the accompanying drawing:

Fig. 1 shows a side elevation partly in section of a combined drill and valve grinder embodying my invention.

Fig. 2 shows a cross sectional view of the same, taken on the line 2—2 of Fig. 1.

Figs. 3 to 6, inclusive show details of the mechanism for oscillating the tool holder, in various positions of its movement.

Fig. 7 shows a similar view, with the oscillating mechanism out of gear, for the purpose of permitting the tool holder to be driven in one direction.

Referring more in detail to the accompanying drawing, I show a casing 10, which contains a motor, the shaft 11 of which motor carries a pinion 12 meshing with a gear 13 on a shaft 14, the latter being supported in a housing 15, detachably secured to one end of the casing 10. The shaft 14 is hexagonal in cross section, and slidably mounted thereon is a pinion 16 adapted to mesh when in one position with a gear 17 fixed upon the spindle 18 of a chuck 19. Through the gearing just described the motor will operate the chuck or tool holder continuously in one direction for drilling or similar purposes.

In the other position, the shiftable pinion 16 meshes with a gear 20 supported on an axle 21 arranged within the housing 15. This gear 20 carries a crank arm 22 with which it is adapted to reciprocate. The outer end of the arm 22 is pivotally connected with a sliding toothed rack 23. This sliding rack 23 is mounted upon a rod 24, which rod is made shiftable, as will hereinafter be described. At the outer end of the toothed rack 23 there is arranged a segmental pinion 25, which is fixed upon a stud fastened to the end of the crank arm 22 concentric to the upper pivotal point thereof. Both the sliding rack 23 and segmental pinion 25 are adapted to mesh with the gear 18 on the chuck spindle when the sliding pinion 16 is brought into mesh with the gear 20.

The segmental pinion 25 being secured at the outer end of the crank arm 22 and located at the outer end of the sliding toothed rack, comes into engagement with the teeth of the gear 17 during the time that the crank arm 22 is on the lower half of both the upward and downward strokes of its cycle. At this time the rack moves out of engagement with the gear 17. Therefore the rocking movement of the segmental pinion caused by the angular movement of the crank arm will serve to advance the gear 17 one or more teeth, as desired. During the upper half of both the upward and downward strokes of the crank arm only the sliding rack 23 is in engagement with the teeth of the gear 17, and hence the reverse movement imparted to the gear 18 is less than the forward movement imparted thereto.

This operation will be clearly understood from an inspection of Figs. 3 to 6, inclusive. In Fig. 3 the crank arm is shown at its upper limit of travel, at which time only the sliding rack is in engagement with the gear 17. This engagement continues until the crank arm nears the lower half of the downward stroke of its cycle, as shown in Fig. 4, at which time the rocking segmental pinion 25 comes into mesh with the teeth of the gear 17, and at the same time the sliding rack moves out of engagement therewith. During most of the time that the crank arm is on the lower half of both the downward and upward strokes of its cycle as shown in Fig. 5 the segmental pinion is being rocked in the direction shown by the arrows in Fig. 5. This rocking movement is sufficient to advance the gear 17 one or more teeth, as desired. By the time the crank arm reaches the upper half of its upward stroke the rocking segmental pinion has passed out of engagement with the gear 17 and the sliding toothed rack has re-engaged said gear as shown in Fig. 6. As a consequence of this mechanism the chuck or tool holder will be progressively stepped ahead so as to insure proper grinding of a valve within its seat.

In order that the oscillating connections just described shall be thrown out of mesh with the gear 17 at the time when the device is being used as a rotary drill, I provide shifting mechanism for the rod 24, consisting of a swinging arm 26 pivotally mounted at one end upon the interior of the casing as shown at 27, and having its opposite end connected with the rod 24. Intermediate the ends of the swinging arm 26 is a branch arm 28 connected to a shifting fork 29, the latter being carried on a shifting rod 30 extending through one end of the housing 15 and having an operating latch 31 arranged on the exterior of the housing. This shifting fork 29 serves also to shift the sliding pinion 16. The connection between the branch arm 28 and the shifting fork 29 is a loose one and when the shifting rod 30 is retracted to the position shown in Fig. 1 the swinging arm 26 will be drawn inwardly by means of a spring 32 so that the sliding rack 23 is brought into engagement with the gear 17. At this time the sliding pinion 16 will be in mesh with the gear 20. When, however, the sliding gear 16 is shifted laterally to engage the gear 17 the shifting fork 29 will come into engagement with the arm 28 and cause the swinging arm 26 to be swung outwardly carrying with it the sliding rack 23 and the segmental pinion 25 to the position shown in Fig. 7.

Having thus described my invention, what I claim and desire to secure by Letters Patent is:

1. In a machine tool, a rotary driving element, a chuck, a gear on the chuck spindle, a crank arm driven by the rotary driving element, a reciprocating member operated by said crank arm and engageable with the gear for oscillating the latter, and a rocking member cooperating with the reciprocating member and actuated also by the crank arm for imparting additional movement to the gear at one end of the movement of the reciprocating member.

2. In a machine tool of the character described, a rotary driving element, a chuck, and connections between the driving element and the chuck for imparting oscillating movement to the chuck, unequally in opposite directions, said connections including a sliding toothed rack having a reciprocating movement, a rocking gear at one end thereof, and a crank arm for operating said rack and gear.

3. In a machine tool of the character described, a rotary driving element, a chuck, and connections between for imparting oscillating movement to the chuck unequally in opposite directions, said connections comprising a gear for operating the chuck, a sliding toothed rack adapted to mesh with the gear and having a reciprocating movement, a rocking segmental pinion arranged at one end of the rack, a crank arm for actuating said rack and segmental pinion, and connections between the crank arm and sliding rack and rocking pinion, so arranged that the rack is in mesh with the gearing during substantially one-half of the movement of the crank arm and the segmental pinion is in mesh therewith during the remainder of the movement of the crank arm.

4. In a machine tool, a rotary driving element, a chuck, a gear on the chuck spindle, a crank arm driven by the rotary driving element, a shiftable rod, a toothed rack slidingly mounted on said rod, a segmental pinion arranged at one end of said rack connections between the crank arm and sliding rack and segmental pinion for operating the latter whereby to cause the gear on the chuck spindle to be oscillated unequally in opposite directions, a shiftable gear for establishing driving connections alternately between the rotary driving element and the gear on the chuck spindle and between the rotary driving element and the crank arm, and connections between said shiftable gear and said shiftable rod whereby when the shiftable gear is in mesh with the gear on the chuck spindle said toothed rack and segmental pinion will be disengaged therefrom.

PHILIP MacKENZIE.